(12) United States Patent
Li et al.

(10) Patent No.: US 7,544,581 B2
(45) Date of Patent: Jun. 9, 2009

(54) METHOD FOR MANUFACTURING DISPLAY SUBSTRATE

(75) Inventors: De-Jiun Li, Jhonghe (TW); Yen-Ju Chen, Pingjhen (TW); Yi-Cheng Tsai, Pingjhen (TW); Der-Chun Wu, Linkou Township, Taipei County (TW); Yui-Chen Liu, Taipei (TW); Kuo-Ching Chou, Jhonghe (TW); Hui-Chuan Lu, Jhongli (TW)

(73) Assignee: Chunghwa Picture Tubes, Ltd. (TW)

( * ) Notice: Subject to any disclaimer, the term of this patent is extended or adjusted under 35 U.S.C. 154(b) by 0 days.

(21) Appl. No.: 12/073,091

(22) Filed: Feb. 29, 2008

(65) Prior Publication Data

US 2009/0011567 A1    Jan. 8, 2009

(30) Foreign Application Priority Data

Jul. 5, 2007    (TW) .............................. 96124420 A

(51) Int. Cl.
*H01L 21/76* (2006.01)
(52) U.S. Cl. .............................. 438/401; 257/E21.525; 349/123; 349/129

(58) Field of Classification Search ................ 438/401; 257/E21.525; 349/123, 129
See application file for complete search history.

(56) References Cited

U.S. PATENT DOCUMENTS

| 2006/0098151 A1* | 5/2006 | Inoue et al. ................. 349/143 |
| 2007/0103629 A1* | 5/2007 | Li ............................... 349/123 |
| 2007/0153213 A1* | 7/2007 | Huang et al. ................ 349/155 |
| 2008/0088774 A1* | 4/2008 | Fan Jiang et al. ........... 349/114 |

* cited by examiner

*Primary Examiner*—Trung Dang
(74) *Attorney, Agent, or Firm*—Bacon & Thomas, PLLC

(57) ABSTRACT

A method for manufacturing a display substrate is disclosed, which includes the following steps: providing a substrate; forming a plurality of bumps on an active area of the substrate and at least one marking pattern on a non-active area of the substrate; and staining the marking pattern or filling a material having low transmittance ratio into the marking pattern. The present invention further discloses a method for making a display substrate, including the steps: providing a substrate; forming a shadow layer on a non-active area of the substrate; forming a plurality of bumps on an active area of the substrate and at least one marking pattern on the shadow layer of the non-active area on the substrate; and removing a part of the shadow layer not covered by the marking pattern.

13 Claims, 6 Drawing Sheets

METHOD FOR MANUFACTURING DISPLAY SUBSTRATE

BACKGROUND OF THE INVENTION

1. Field of the Invention

The present invention relates to a method for manufacturing a display substrate, and more particularly to a method for manufacturing a display substrate in which opposite substrates can be easily assembled by accurate alignment.

2. Description of Related Art

A display panel of a liquid crystal display device (LCD) contains a color filter substrate, a thin film transistor (TFT) array substrate, and a liquid layer interposed therebetween.

In a process of assembling a liquid crystal panel, a gap is formed between the two substrates owing to existence of spacers while assembling the substrates. In this process, a highly accurate alignment technique for assembling the two substrates is required, or else light leakage of the panel due to misalignment occurs thereby impairing panel brightness.

Multi-domain vertical alignment (MVA) technique features prompt signal response time, wider viewing angles, efficient improvement in mura issues, promotion of transmittance and contrast ratio, and perfection of display quality. In the MVA technique of manufacturing upper and lower substrates, bumps and slits are arranged alternately so that liquid crystal molecules tilt in a certain angle while no electric field is applied. If an electric field is applied, the tilt angle of the liquid crystal molecules changes rapidly so that backlight can pass through the liquid crystal faster, which results in a significant decrease of display time. Besides, the liquid crystal molecules align in the certain angle because of the bumps so as to extend the viewing angle.

In the process for assembling panels of conventional MVA-LCDs, a black matrix and a metal electrode layer (a gate or drain) respectively on a color filter and a TFT substrate serve as alignment marks. In the process manufacturing the color filter substrate, the black matrix and bumps are aligned in accuracy of ±3 μm, and accuracy of assembling panels is below ±5 μm. Therefore, alignment accuracy between the bumps on the color filter substrate and the slits on the TFT substrate is of error about ±8√2 μm which causes domain abnormality which affects brightness of the panel.

A method for manufacturing a color filter substrate is disclosed in US patent publication No. 2005/0106477A1. A structure of the color filter substrate is shown in FIG. 1. While manufacturing color filter layers 303a, 303b, and 303c, an alignment mark area on a non-active area of a substrate 301 is enclosed by hydrophobic color material serving as barriers 311, 312. At the same time of manufacturing a black matrix 302, the black matrix material is also injected between the barriers 311 and 312 so as to form an alignment mark 310 which benefits alignment accuracy between the two substrates during assembly.

However, the technique disclosed in the prior art described above only can be applied in methods for manufacturing color filter substrates requiring a black matrix because the alignment mark 310 and the black matrix 302 are made of the same material and formed at the same step. Besides, the foregoing technique can only be applied to alignment of assembling panel of TN-LCDs, i.e. alignment of the black matrix and the TFT substrate. Nevertheless, while assembling panels of MVA-LCDs, there is a requirement for alignment between the bumps and the slits respectively on the upper and lower substrates. Hence, the technique disclosed in US patent publication No. 2005/0106477A1 fails to satisfy a need for accurate alignment when that technique is applied in assembling panels of MVA-LCDs.

In order to overcome aforementioned difficulty, the industry makes efforts in development of methods for assembling panels of MVA-LCDs.

SUMMARY OF THE INVENTION

The present invention provides a method for manufacturing a display substrate. When a panel of an MVA-LCD is assembled, bumps and slits on upper and lower substrates in the panel structure can be positioned as an alignment benchmark so that problems such as inaccurate alignment of bumps and slits can be excluded to improve panel quality.

The present invention provides a method for manufacturing a display substrate. By using a marking pattern to achieve accurate alignment, abnormal events occurring in a domain can be prevented and the panel quality can be advanced in a display device manufactured by the method in the present invention.

In the present invention, formation of the marking pattern on a substrate can be performed at the same time as manufacturing of bumps. Besides, the marking pattern can be stained either posterior to the process of manufacturing the bumps or in the process of assembling the panel.

The method for manufacturing a display substrate in the present invention comprises: providing a substrate; forming a plurality of bumps on an active area of the substrate and at least one marking pattern on a non-active area of the substrate at the same time; and staining the marking pattern or filling a low transmittance material in the marking pattern.

The substrate described in the present invention is not limited to, but preferably can comprise a color filter substrate. The substrate also can be applied in a color filter on array (COA) substrate.

The bumps and the marking pattern of the present invention can be made of any material such as the same material or different materials. However, in order to economize steps and costs in the practice, the bumps and the marking pattern can preferably be made of the same material by the same step.

In the method of the present invention, in order to easily identify the marking pattern, the marking pattern is preferably filled with a low transmittance material. Filling the marking pattern can be performed by a variety of methods, but is preferably performed by ink-jet. Besides, a black matrix is preferably formed on the active area. In order to save time in manufacturing, more preferably the marking pattern is stained or filled at the meantime of manufacturing the black matrix. The black matrix can preferably made of the same material as the low transmittance material.

In the present invention, the marking pattern is not limited in a specific pattern, but can be a circle or a square protrusion structure, an intersectional protrusion structure, a geometric protrusion structure, or a square structure having a recess in the center thereof. The marking pattern can be stained by any method, for examples filling a low transmittance material by ink-jet into the marking pattern which is a square structure having a central recess, or coloring external of the marking pattern being a protrusion by way of transfer printing.

Because the bumps and the marking pattern can preferably be formed at the same step and made of the same material, material of the square structure having a central recess can preferably be the same as that of the bumps.

Furthermore, the present invention provides another method for manufacturing a display substrate, comprising: providing a substrate; forming at least one shadow layer on a non-active area of the substrate; forming a plurality of bumps on an active area of the substrate and a marking pattern on the shadow layer of the non-active area of the substrate at the same time; and removing a part not covered by the marking pattern of the shadow layer.

As illustrated above, the substrate described in the present invention is not limited to, but preferably can comprise a color filter substrate. The substrate also can be applied in a color filter on array (COA) substrate.

The bumps and the marking pattern of the present invention can be made of any material such as the same material or different materials. However, in order to economize steps and costs in the practice, the bumps and the marking pattern can preferably be made of the same material by the same step.

Besides, a black matrix is preferably formed on the active area. More preferably, the marking pattern can be stained during formation of the black matrix. The black matrix can be made of the same material as the low transmittance material such as resin or metal chelates.

In the method of the present invention, the shadow layer can be of a greater area than the predetermined marking pattern. In order to prevent influence on accurate alignment of assembling panels, the part not covered by the marking pattern of the shadow layer is preferably removed so as to indeed exhibit the position of the marking pattern after completion of the marking pattern. Removal methods are not limited to, but preferably is laser ablation.

Other objects, advantages, and novel features of the invention will become more apparent from the following detailed description when taken in conjunction with the accompanying drawings.

BRIEF DESCRIPTION OF THE DRAWINGS

FIG. 2(*b*) is a perspective view of the structure of a color-filter-on-array substrate manufactured in Example 1-2 of the present invention;

DETAILED DESCRIPTION OF THE PREFERRED EMBODIMENT

Features of the present invention are illustrated by the following Examples describing MVA-LCD.

Example 1-1

Figure 1:
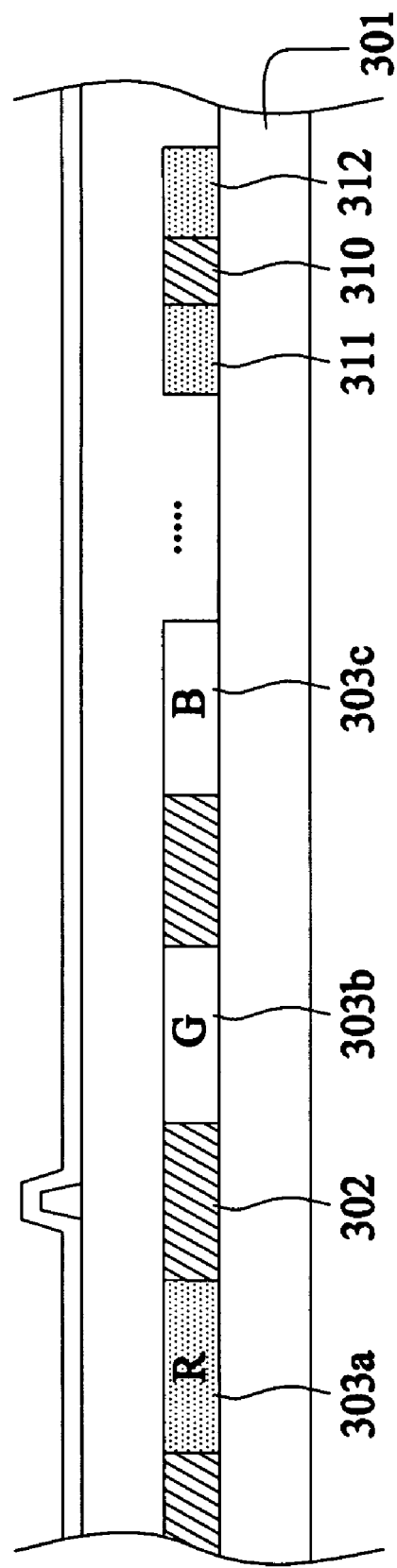
FIG. 1 is a perspective view of the structure of a conventional color filter substrate.
Figure 2:
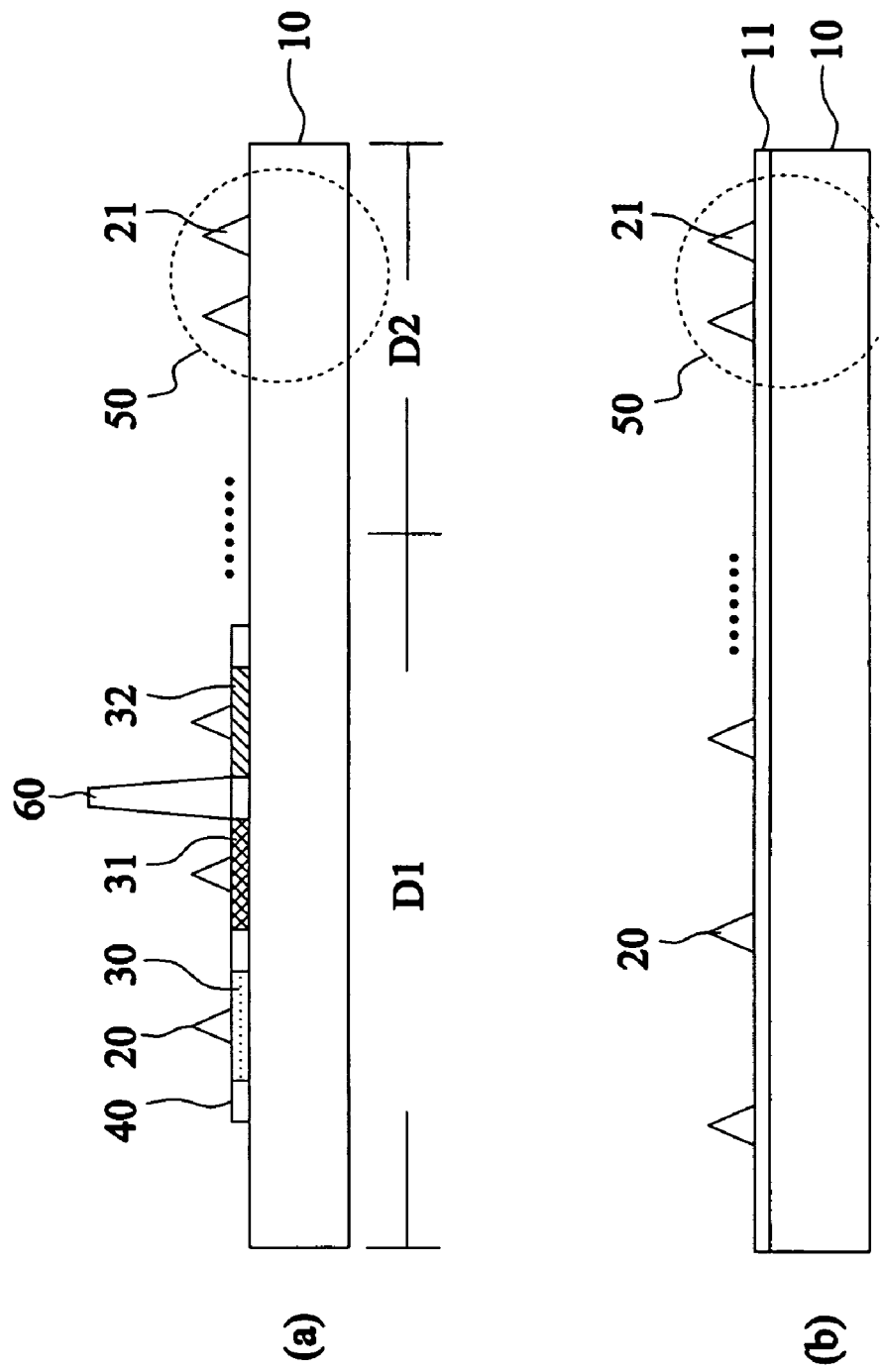
FIG. 2(*a*) is a perspective view of the structure of a color filter substrate manufactured in Example 1-1 of the present invention.

In accordance with a conventional method for manufacturing a color filter substrate, the structure of the substrate is shown in FIG. 2(*a*) as a cross-sectional view. On a substrate 10 demarcated with an active area D1 and a non-active area D2, a black matrix 40 is formed on the active area D1 by the conventional method such as steps of exposure and development. The black matrix 40 is used as a barricade, and then gaps are filled respectively with pigments of three primary colors which respectively are red (R) 30, green (G) 31, and blue (B) 32.

A marking area 50, which is usually located on a margin of the substrate 10, is predetermined as an area for locating of a marking pattern 21 on the non-active area D2 of the substrate 10. Subsequently, a plurality of bumps 20 are formed on the active area D1. In the present Example, the bumps 20 are at the same distance from each other. At least one marking pattern 21 can also be formed on the marking area 50 by the same mask during the step of forming the bumps 20.

Finally, a plurality of spacers 60 are formed on the black matrix 40 so that a color filter substrate having the marking pattern 21 can be accomplished.

Example 1-2

The structure of another display substrate is shown in FIG. 2(*b*). This kind of the substrate is suitable to be applied in a color filter on array substrate. The substrate is illustrated as follows. A marking pattern 21 located on a marking area 50, and bumps 20 both are formed on a substrate 10 containing a transparent conductive layer 11. Other components such as color filter layer and spacers etc. are formed on another opposite substrate (not shown). In the present Example, it is not necessary for a black matrix 40 to be formed on the substrate 10 having the bumps 20 and the marking pattern 21.

Example 2

Figure 3:
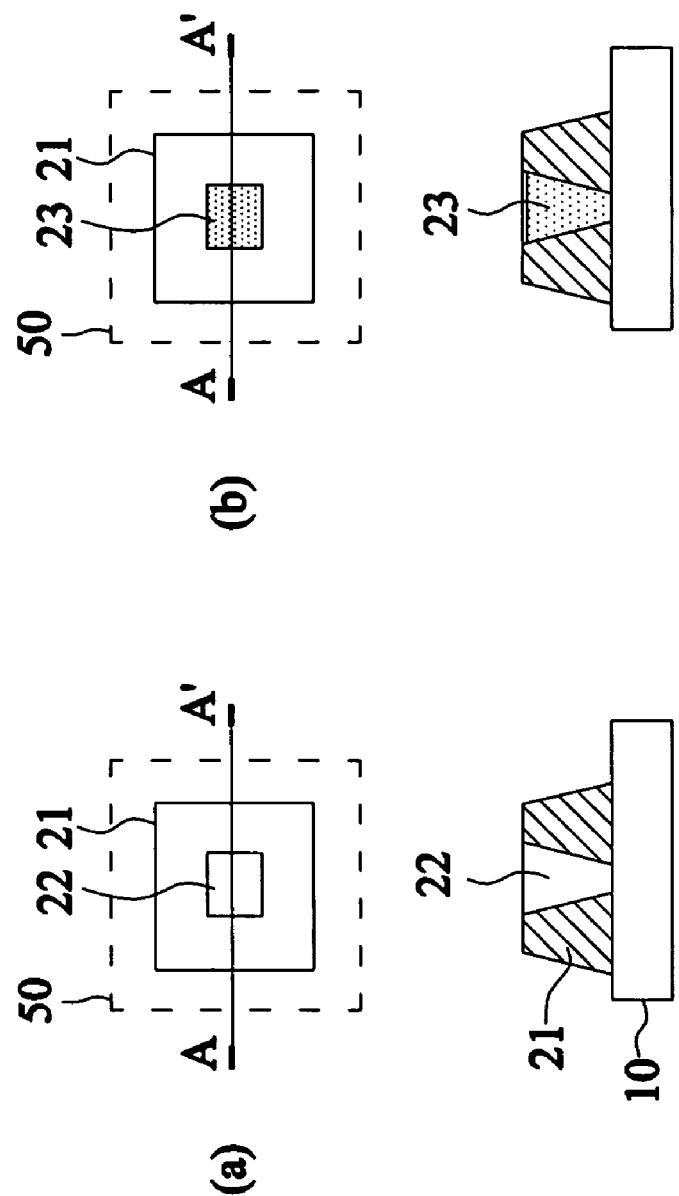
FIGS. 3(*a*) and 3(*b*) show a top view and a cross-sectional view of a marking pattern on a marking area illustrated in Example 2 of the present invention.

With reference to FIGS. 3(*a*) and 3(*b*), the marking patterns 21 located on the marking area 50 illustrated in Examples 1-1 and 1-2 are respectively shown in a top view and in a cross-sectional view. The lower figures of FIGS. 3(*a*) and 3(*b*) are corresponding cross-sectional views of the upper figures of FIGS. 3(*a*) and 3(*b*) along A-A' lines. In the present Example, the marking pattern 21 formed on the substrate is a square structure having a central recess 22, which is made of the same material as the bumps 20 as shown in FIG. 2.

Subsequently, the recess 22 is filled with a low transmittance material. As shown in FIG. 3(*b*), a filler 23 in the central recess 22 can be recognized in a top view so as to benefit assembling panels.

In the present Example, the low transmittance material is the same as the material of the black matrix such as resin or metal chelates. Besides, the recess 22 is filled by ink-jet in the present Example.

Example 3

Figure 4:
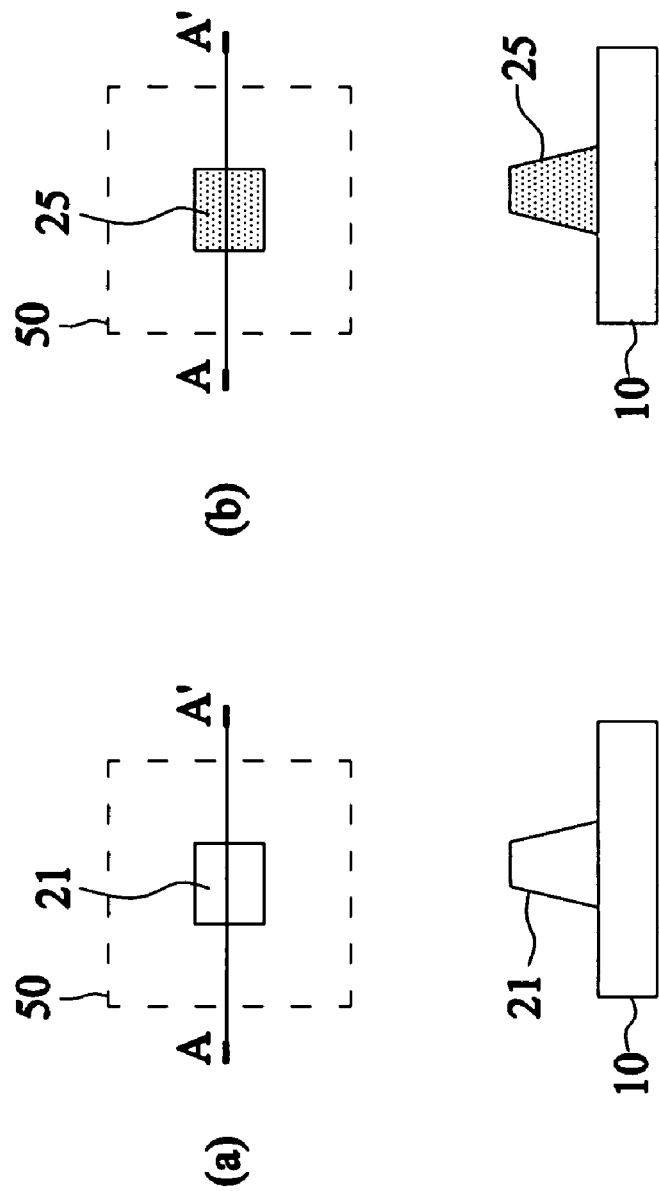
FIG. 4 shows a top view and a cross-sectional view of a protrusion structure serving as a marking pattern illustrated in Example 3 of the present invention.

In the present invention, another marking pattern 21 is a protrusion structure, of which a top view and a cross-sectional view are respectively in FIGS. 4(*a*) and 4(*b*).

A method for manufacturing a display substrate of the present invention is the same as illustrated in Example 1. In the present Example, the marking pattern 21 shaped in a protrusion on the marking area 50 is formed on the non-active area D2 of the substrate 10 at the same time as forming the bumps on the active area. Then, external of the protrusion structure 21 is stained to form a colored marking pattern 25.

Example 4

Figure 5:
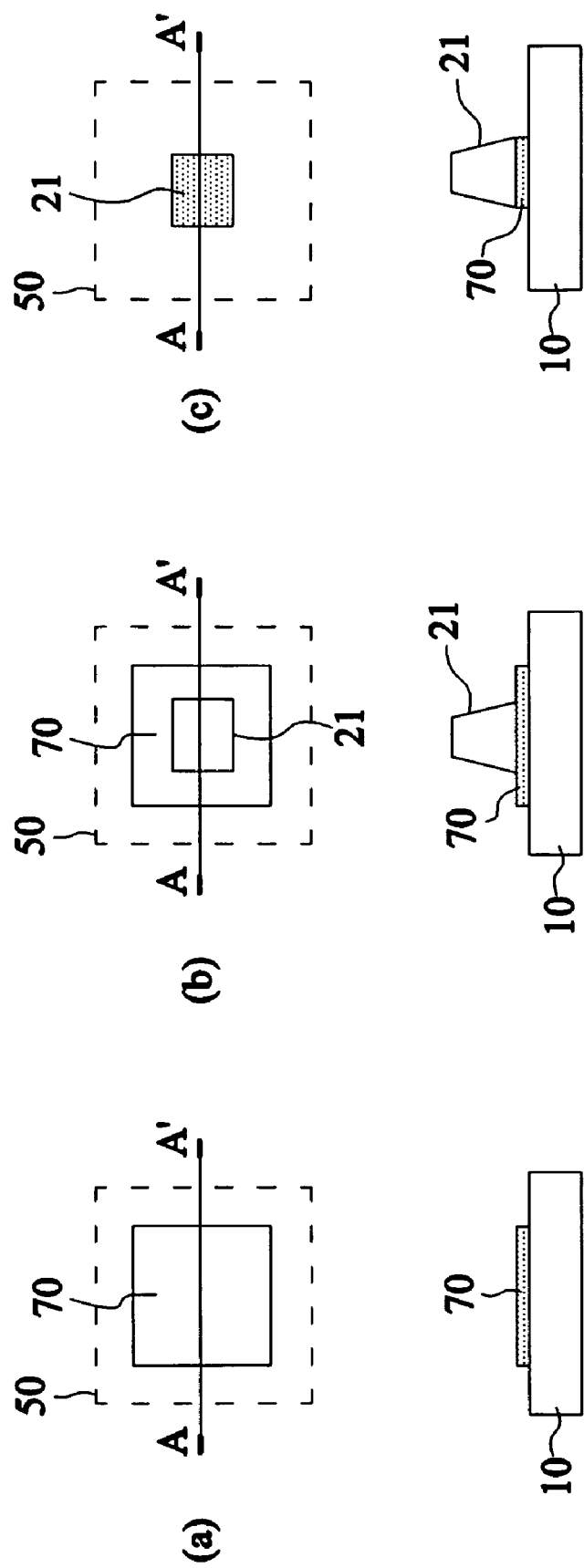
FIG. 5 shows a top view and a cross-sectional view of a marking pattern having a shadow layer illustrated in Example 3 of the present invention.

A method for manufacturing another marking pattern of the display substrate in the present example is illustrated with reference to top views and cross-sectional views of FIGS. 5(*a*) to 5(*c*).

A shadow layer 70 is formed on the marking area 50 of the substrate 10. In the present Example, the shadow layer 70 is made of the same material as the black matrix such as resin or metal chelates. The structure is shown in FIG. 5(a).

During the formation of the bumps 20 on the active area, a marking pattern 21 is simultaneously formed on the shadow layer 70 in the marking area 50. The shadow layer 70 can be in the same or different range of the marking pattern 21. When the shadow layer 70 is larger than the marking pattern 21, a step for removing the shadow layer 70 not covered by the marking pattern 21 can be performed.

In the present Example, the exposed shadow layer 70 is removed by laser ablation so that the bottom of the marking pattern 21 is of the same size as the shadow layer 70. Through the method illustrated in the present Example, it is not necessary for the marking pattern 21 to be stained by additional steps. Besides, the color of the shadow layer 70 can be observed directly on the marking pattern 21. Therefore, the marking pattern 21 can be recognized easily.

Example 5

Figure 6:
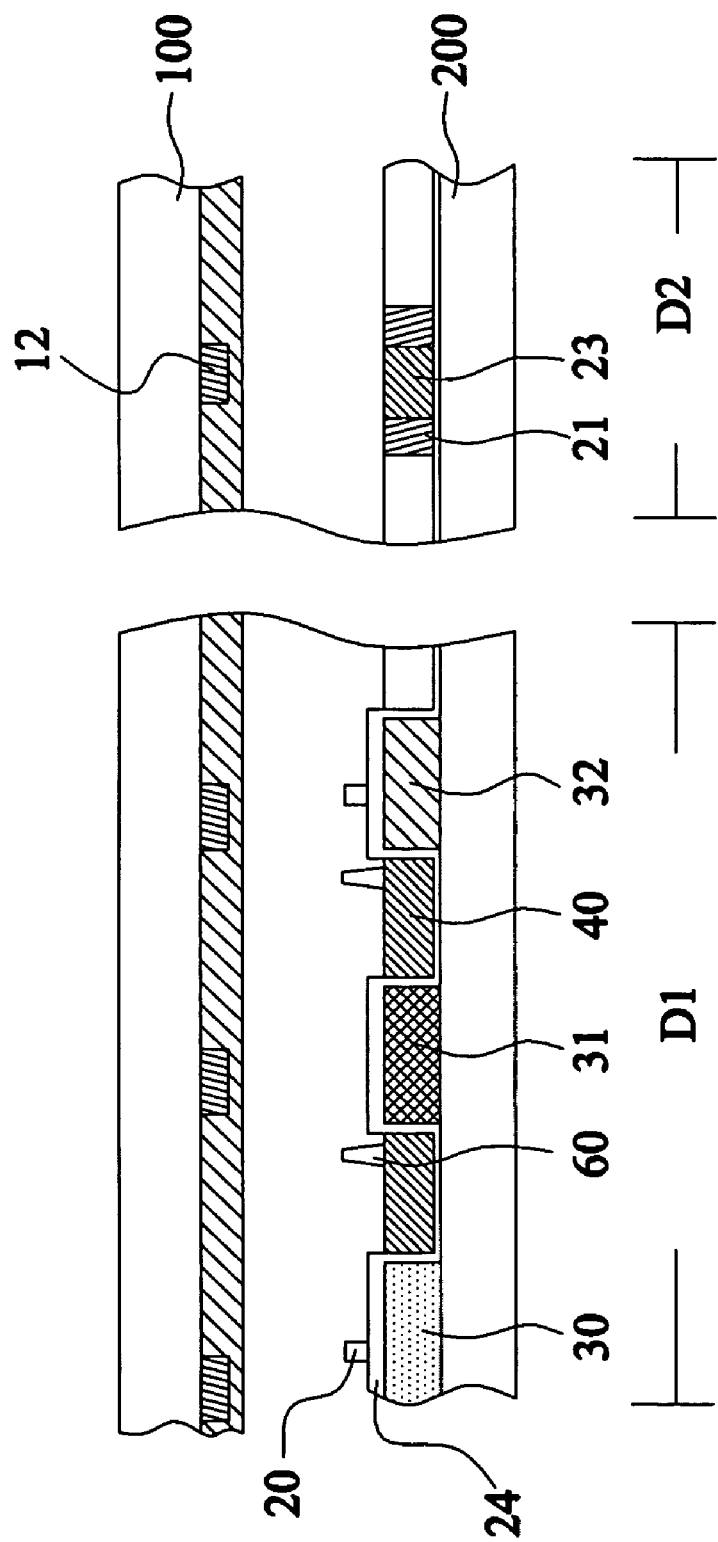
FIG. 6 is a perspective view of assembling a TFT substrate and a color filter substrate in the present invention.

First, a color filter substrate 200 demarcated with an active area D1 and a non-active area D2 is provided. Through conventional processes such as exposure and development, three primary colors, i.e. red (R) 30, green (G) 31, and blue (B) 32, are formed on the active area D1 (as shown in FIG. 6). Thus, gaps are formed between the three primary colors. Subsequently, a transparent conductive layer 24 which can be made of ITO or IZO is formed. Then, a plurality of bumps 20 and at least one marking pattern 21 are formed on the active area D1 and on the non-active area D2 respectively. Finally, the gaps and internal of the marking pattern 21 are filled with a filler 23 by ink-jet at the same time so that a black matrix 40 is formed between the areas of the three primary colors. Herein, the filler 23 is made the same material as a low transmittance material of a black matrix such as resin or metal chelates. Additionally, a plurality of spacers 60 are selectively formed on the black matrix 40, if necessary. Therefore, the color filter substrate 200 having the marking pattern 21 is accomplished.

The color filter substrate 200 and an opposite substrate 100 such as a TFT substrate can be accurately assembled into a panel, by way of alignment between the marking pattern 21 of the color filter substrate 200 and a gate metal layer 12 of the opposite substrate 100. Furthermore, in the color filter substrate 200, "alignment errors" do not exist between the bumps 20 and the black matrix 40 so that the panel assembling process can be extremely accurate. Finally, after performing following processes such as filling liquid crystal and sealing, an LCD with the substrate having the marking pattern can be accomplished.

Although the present invention has been explained in relation to its preferred embodiment, it is to be understood that many other possible modifications and variations can be made without departing from the scope of the invention as hereinafter claimed.

What is claimed is:

1. A method for manufacturing a display substrate, comprising:
    providing a substrate;
    forming a plurality of bumps on an active area of the substrate and at least one marking pattern on a non-active area of the substrate at the same time; and
    staining the marking pattern or filling a low transmittance material in the marking pattern.

2. The method as claimed in claim 1, wherein the substrate comprises a color filter substrate.

3. The method as claimed in claim 1, where the bumps are made of the same material as the marking pattern.

4. The method as claimed in claim 1, wherein the low transmittance material is filled in the marking pattern by ink-jet.

5. The method as claimed in claim 1, wherein the display substrate is formed with a black matrix on the active area, and the black matrix is made of the same material and formed at the same time as the low transmittance material.

6. The method as claimed in claim 1, wherein the marking pattern is stained by ink-jet or by transfer printing.

7. The method as claimed in claim 1, wherein the marking pattern is a square structure having a recess in the center thereof.

8. The method as claimed in claim 7, wherein the square structure is made of the same material and formed at the same time as the bumps.

9. The method as claimed in claim 1, wherein the marking pattern is a protrusion structure.

10. A method for manufacturing a display substrate, comprising:
    providing a substrate;
    forming at least one shadow layer on a non-active area of the substrate;
    forming a plurality of bumps on an active area of the substrate and a marking pattern on the shadow layer of the non-active area of the substrate at the same time; and
    removing a part not covered by the marking pattern of the shadow layer.

11. The method as claimed in claim 10, where the bumps are made of the same material as the marking pattern.

12. The method as claimed in claim 11, after forming the bumps and the marking pattern, further comprising forming a black matrix on the active area.

13. The method as claimed in claim 10, wherein the part not covered by the marking pattern of the shadow layer is removed by laser ablation.

* * * * *